(No Model.)
H. A. DIEHL.
PRODUCTION AND MANUFACTURE OF PURE ASPHALTUM, &c., FROM NATURAL ASPHALT.
No. 469,777. Patented Mar. 1, 1892.
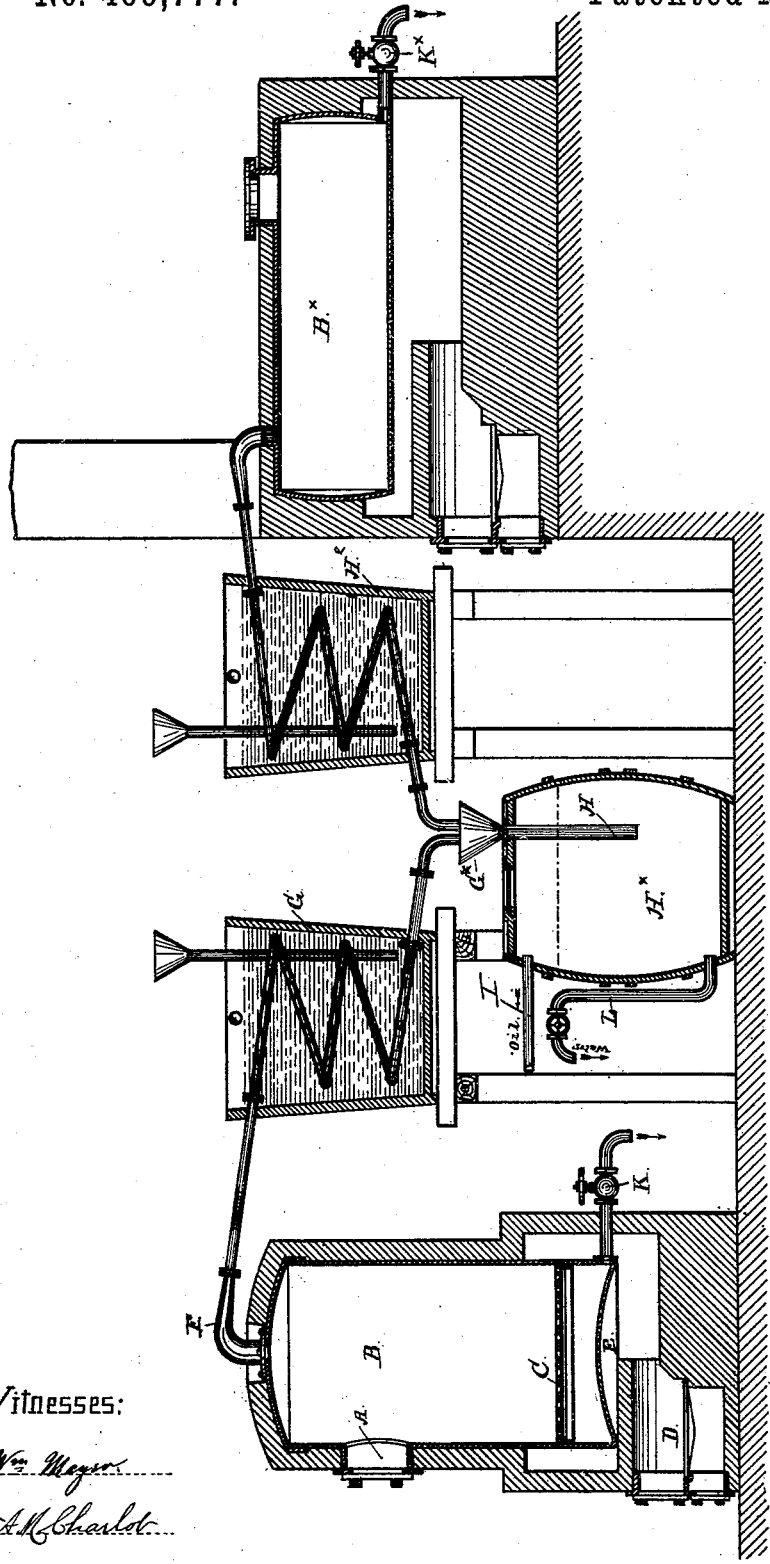
Witnesses:
Inventor:
Henry A. Diehl
By Smith & Osborn
Attys

UNITED STATES PATENT OFFICE.

HENRY A. DIEHL, OF SAN FRANCISCO, CALIFORNIA.

PRODUCTION AND MANUFACTURE OF PURE ASPHALTUM, &c., FROM NATURAL ASPHALT.

SPECIFICATION forming part of Letters Patent No. 469,777, dated March 1, 1892.

Application filed December 12, 1890. Serial No. 374,495. (No model.)

*To all whom it may concern:*

Be it known that I, HENRY ALEXANDER DIEHL, a subject of the Emperor of Germany, residing at San Francisco, in the county of San Francisco and State of California, have invented certain new and useful Improvements in Processes of and Apparatus for Producing and Manufacturing Pure Asphaltum from Natural Asphalt, of which the following is a specification.

The object of my invention is to produce pure asphaltum from natural asphaltic substances, such as bituminous rock, bituminous sand, and asphaltic tar or brea. The pure asphalt so obtained is intended for use in roofing, paving, insulating, and for other purposes.

The nature of these improvements and the manner in which I proceed to produce and obtain pure asphalt or bitumen are fully set forth and illustrated in the following description and the accompanying drawing.

In the drawing the figure is an elevation in longitudinal section of my apparatus for obtaining pure asphaltum and by-products from bituminous substances.

In carrying out my invention for obtaining pure asphalt the crude asphalt is conveyed through the man-hole A to the retort B and is delivered into a perforated removable diaphragm or plate C and subjected to heat from a fire in the furnace D directly underneath the retort. The bottom of the boiler or retort is of concave form upwardly, as shown at E, by which means a greater heating-surface is obtained. Fire having been made in the furnace will cause the contents of the retort to become heated. The bitumen will melt and liquefy and pass through the perforated diaphragm or false bottom and be received upon the upper convex surface of the bottom plate of the retort, while part of the volatile portions—such as the oils, water, and gases—will pass upward and out through the pipe F at the top of the retort, into the condensing-coil located in the water-tank G and out through the side of this condensing-tank into the funnel $G^\times$ and from thence into the extended pipe H and into the tank $H^\times$. The water is carried off from tank $H^\times$ through pipe L, connected at or near the bottom of said tank, and the oil through pipe I, connected at the top of said tank. The liquid bitumen in retort B is now drawn off through the cock K and conveyed to the horizontal retort $B^\times$, and further treated to heat from the furnace underneath to eliminate the remaining volatile matter contained in the bitumen, which passes out through the pipe at the top coil and condensing-tank $H^2$ into the tank $H^\times$, while the further-purified bitumen, freed from all impurities, is drawn off from the retort $B^\times$ through the cock $K^\times$ for use. In thus subjecting the material to the purifying process the bitumen is freed from watery and earthy impurities mechanically, while the distillation eliminates all chemical impurities, such as ammonia, anthracine, and other volatile matter.

Having thus fully described my invention, what I claim, and desire to secure by Letters Patent, is—

1. The process herein described of obtaining pure asphaltum, which consists in subjecting the bituminous substance to a sufficient degree of heat in a closed primary retort to melt it, separating from the melted bitumen its earthy and solid impurities, and again submitting the thus-purified bitumen to heat in a secondary closed retort to distill it.

2. The combination of an upright retort having a perforated false bottom and a concave imperforate bottom beneath it, a discharge from the retort beneath the false bottom and a pipe connected to the top of the retort, a condensing water-tank through which the latter pipe is coiled, a secondary horizontal retort also having a discharge at the bottom, a pipe connected to the top thereof and a water-tank through which the top pipe of the secondary retort is coiled, a receiving-tank below the water-tanks, into which the top pipes of both retorts discharge, and means for heating the retorts, substantially as described.

In testimony that I claim the foregoing I have hereunto set my hand and seal.

HENRY A. DIEHL. [L. S.]

Witnesses:
 C. W. M. SMITH,
 CHAS. E. KELLY.